United States Patent Office 3,388,654
Patented June 18, 1968

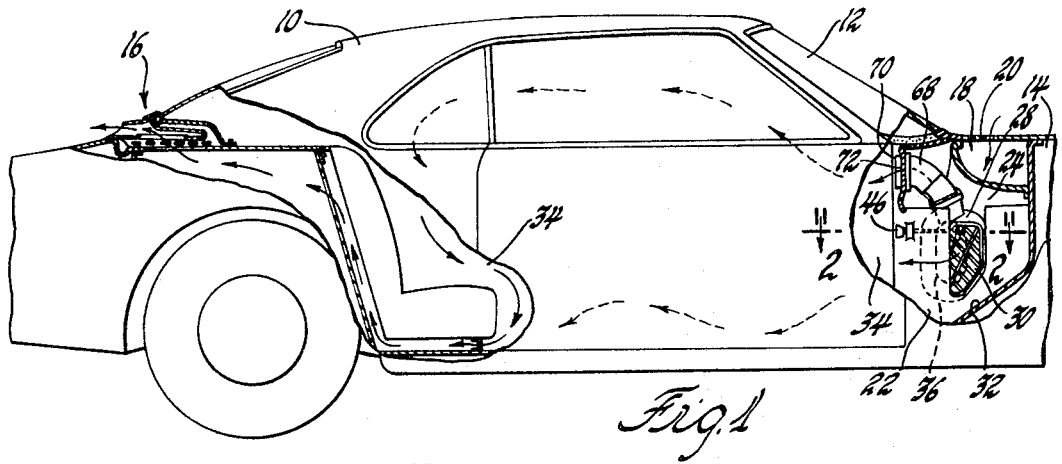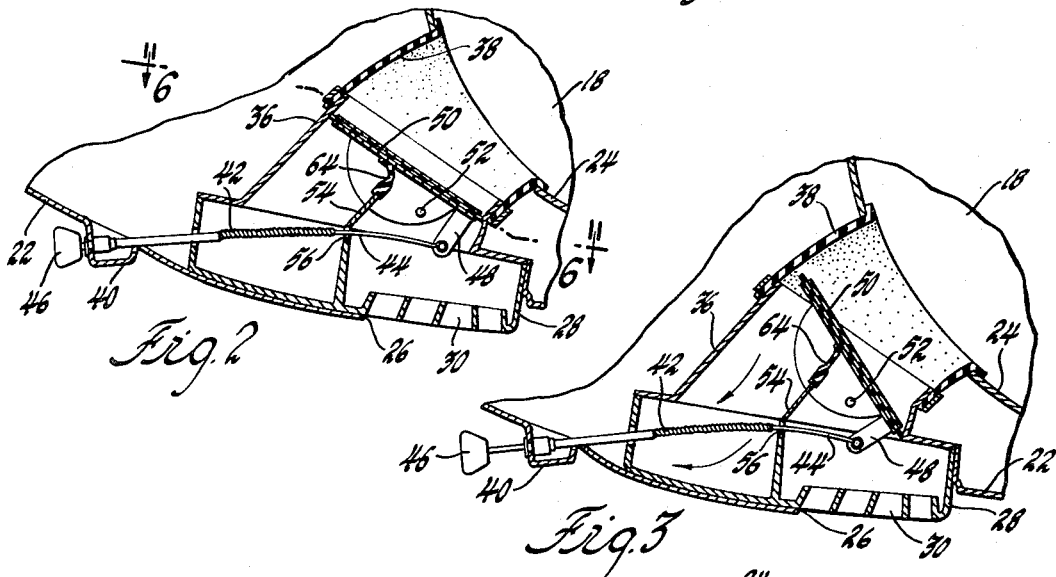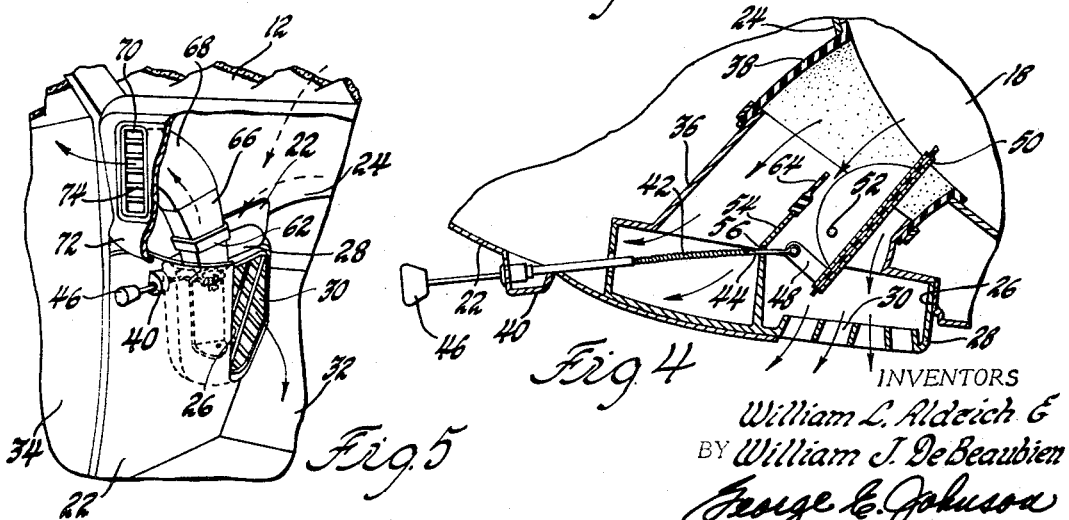

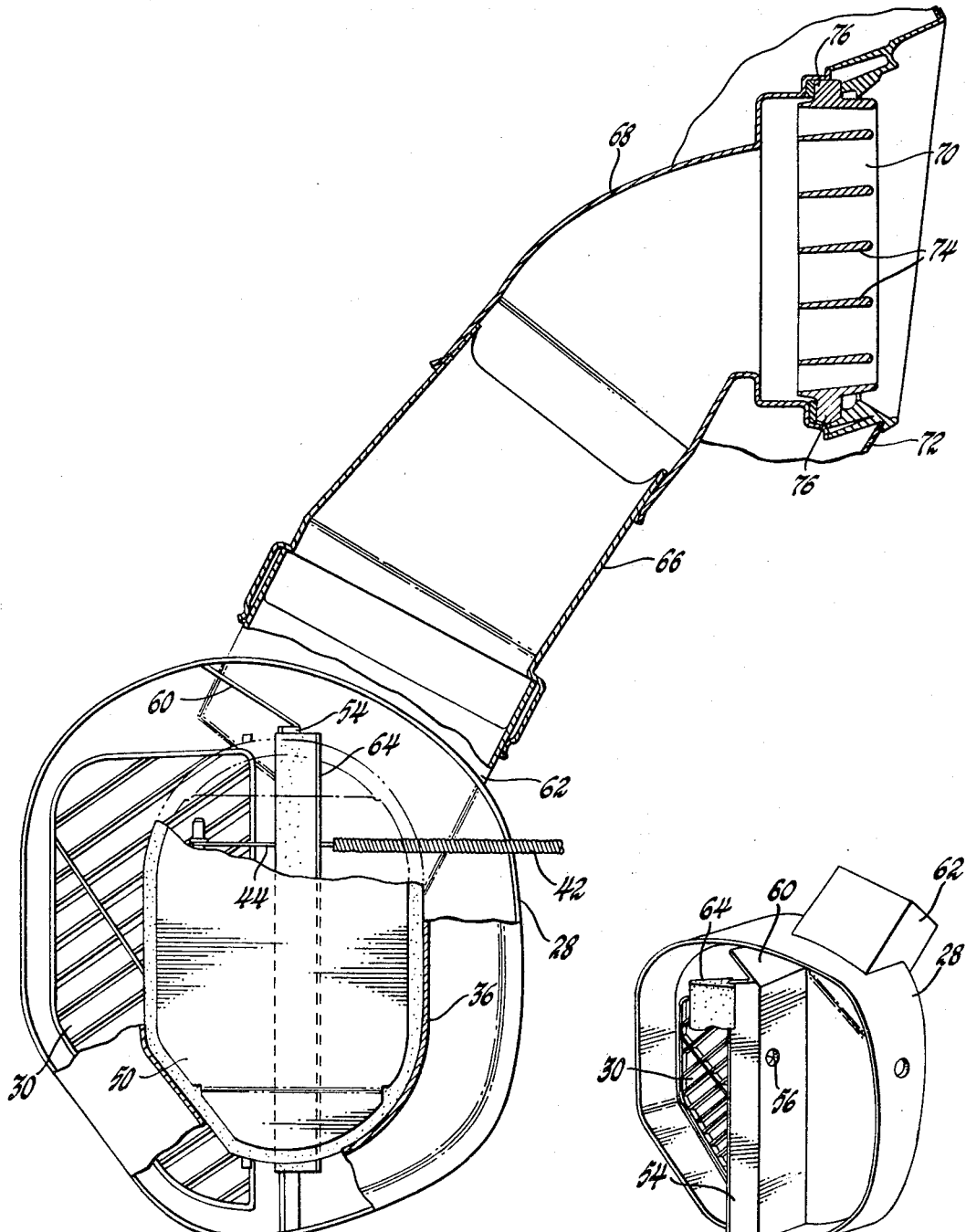

3,388,654
AUTOMOBILE AIR ADMISSION SYSTEM
William L. Aldrich, Jr., Clarkston, and William J. De Beaubien, Birmingham, Mich., assignors to General Motors Corporation, Detroit, Mich., a corporation of Delaware
Filed Aug. 17, 1966, Ser. No. 572,986
5 Claims. (Cl. 98—2)

ABSTRACT OF THE DISCLOSURE

A system for admitting air to an automobile passenger compartment from which air discharge may be conventional but the air admission being directed rearwardly and from windshield base height to lower levels at one or both sides of the compartment with a simple and convenient damper control for effecting a selective diffusion of air flow thereby promoting passenger comfort.

The United States Patent 2,852,997, granted Sept. 23, 1958, in the names of J. D. Leslie, R. M. Fox and E. J. Premo, discloses a system for admitting air from a windshield base and through side or shroud chambers to a passenger compartment. It includes a damper control but all the air admitted is admitted immediately above the toe board giving a rather strong concentration or blast of air which sometimes is desirable but at other times is not conducive to passenger comfort.

The United States Patent 2,987,981, granted June 13, 1961, in the name of H. W. Boylan, discloses an adjustable grille for admitting air at one end of an automobile instrument panel. It serves to diffuse air as it is admitted but all air is admitted at a high level to the passenger compartment leaving the zone immediately above the compartment floor a relatively dead air space.

An object of the present invention is to provide an improved system for admitting air to an automobile passenger compartment at selective levels below the windshield base in order to promote passenger comfort.

A feature of the present invention is a system including two groups of air discharge outlets directed rearwardly and located at one or both sides of an automobile cowl with valving giving a controlled height of air admission and diffusion.

This and other important features of the invention will now be described in detail in the specification and then pointed out more particularly in the appended claims.

In the drawings:

FIGURE 1 shows an elevation view of a portion of an automobile with parts removed better to illustrate the invention;

FIGURE 2 is an enlarged sectional view looking in the direction of the arrows 2—2 in FIGURE 1 with an air inlet fully closed;

FIGURES 3 and 4 are views similar to that of FIGURE 2 but with the inlet half open and fully open respectively;

FIGURE 5 is a perspective view of the air admission system of FIGURES 1-4 with a portion of the instrument panel broken away;

FIGURE 6 is an enlarged sectional view looking in the direction of the arrows 6—6 in FIGURE 2; and FIGURE 7 is a perspective view, drawn to a reduced scale, of a portion of the duct shown in FIGURE 6.

The automobile of FIGURE 1 is shown as having a body 10, a windshield 12, a front engine compartment 14, and a rear air vent system generally indicated at 16 as well as an air admission cowl chamber 18 having an entrance grille 20 and permanently open to ambient air.

These items are as known heretofore. The chamber 18 is U-shaped and extends downwardly at both sides of the body as disclosed in the Patent 2,852,997 above referred to. The rear vent system 16 is as disclosed in the United States Patent 3,143,951, granted Aug. 11, 1964, in the name of A. K. Watt. Insofar as the present invention is concerned any of numerous vent or air discharge systems may be employed in place of the one disclosed in FIGURE 1. The gist of the present invention resides in the air admission features whereas a vent system is depicted in FIGURE 1 merely in the interest of completeness.

A left-hand shroud side inner trim panel is depicted at 22 and, outboard from that panel 22, is a sheet metal section constituting a downwardly extending wall portion 24 of one leg of the cowl chamber 18. The panel 22 has a large opening 26 for receiving and retaining a portion of duct 28 in such a manner that a louvered opening 30 of the latter presents multiple outlets directed through the opening 26 and over the toe board 32 into the passenger compartment 34. The duct 28 has a horizontal leg 36 connected by means of a flexible conduit 38 to the chamber 18.

The trim panel 22 is formed with a protuberance 40 which is adapted to cooperate with the duct 28 in supporting a short guidance tube and flexible conduit device 42 for retaining a push-pull wire 44. The exposed end of the latter is provided with a hand knob 46 and the other end is pivoted to an arm 48 integral with a damper 50. The damper is pivoted on a vertical axis as at 52 to the duct 28 in such a way as to control flow of air through the leg 36 to one or both sides of a partition 54.

The partition 54 has an opening 56 for the wire 44 and its top is inclined as at 60 so that a rectangular outlet 62 leads upwardly and only from one side of the partition 54. A flexible rubber flap 64 forms an extension of the partition 54 and acts as a seal with the damper 50 except when the latter is fully open or approaches that position. Conduits 66 and 68 connect the outlet 62 to an outlet nozzle 70 arranged at the left end of an instrument panel 72. The nozzle 70 has louvers 74 and presents multiple outlets for diffusing air and is mounted on vertical axis pivots 76 for adjustment of air flow direction. This nozzle 70 may be like that described in the United States Patent 2,987,981, granted June 13, 1961, in the name of H. W. Boylan.

The air admission features are depicted as mounted only on the left side of the passenger compartment but obviously the same arrangement would ordinarily be used on the right side as well. Also, while provision is made for admitting only ventilation air insofar as the drawings are concerned, it will be understood that suitable connections may be made whereby heated or cooled air may be handled by the two groups of multiple outlets at 30 and 70. Also, conduit 38 is illustrated in the drawings as being of flexible material but that conduit as well as the others used could be made of rigid or semirigid materials without departing from this invention.

Assuming the knob 46 is pushed as in FIGURE 2, the damper 50 will be fully closed and no ventilation air may enter from the cowl chamber 18. If some air admission is desired, however, then the knob 46 is pulled out a short or desired distance as in FIGURE 3 with the result that the damper 50 is partially opened admitting air only through the upper level nozzle 70. If the knob 46 is pulled out further, as in FIGURE 4, air is admitted through both high and low level outlets 70 and 30. It is to be noted that the low level admission is not effective or operable except when the passenger desires a great deal of air flow, i.e., the extent of projection of the knob 46 not only determines the amount of air admitted but also the depth of field or zone in the passenger compartment directly affected by the admission. This gives an extensive range of adjustability under the diverse conditions encountered in automobile operation and such is needed for optimum comfort.

We claim:

1. An air admission system for an automobile having a passenger compartment, an instrument panel, and a side cowl air admission chamber permanently open to ambient air, said system including duct work with two groups of multiple air diffusion discharge outlets directed rearwardly from said chamber, said outlets being located at one side of said compartment at different levels, and damper means arranged to control said outlets sequentially to give a controlled height of air admission and diffusion.

2. A system as set forth in claim 1, said outlets having louvers effective to diffuse air discharged from said outlets into said compartment, one of said groups of outlets being beneath the level of the said instrument panel, and the other group of said outlets being at one end of said panel.

3. A system as set forth in claim 1, said damper means consisting of a single damper.

4. A system as set forth in claim 1, said damper means consisting of a single damper effective when being opened first to direct air through an upper level outlet only and then through a lower level outlet.

5. A system as set forth in claim 1, said damper means and multiple outlets being operable to determine the amount of air admitted to the passenger compartment and also the depth of field or height of the zone in the said passenger compartment directly and immediately affected by the air admission whereby dead pockets in said compartment may be increased and minimized.

References Cited

UNITED STATES PATENTS

| | | | |
|---|---|---|---|
| 2,696,774 | 12/1954 | Bayley | 98—2.4 |
| 2,738,718 | 3/1956 | Reynolds | 98—2.4 |
| 2,876,998 | 3/1959 | Csabi | 98—2 |
| 3,260,187 | 7/1966 | Nallinger | 98—2 |
| 3,301,161 | 1/1967 | Attwood | 98—2 |
| 3,327,603 | 6/1967 | DeCastelet | 98—2 |

MEYER PERLIN, *Primary Examiner.*